US006832331B1

(12) United States Patent
Manning et al.

(10) Patent No.: US 6,832,331 B1
(45) Date of Patent: Dec. 14, 2004

(54) FAULT TOLERANT MASTERSHIP SYSTEM AND METHOD

(75) Inventors: Thomas A. Manning, Northborough, MA (US); Stephen A. Caldara, Sudbury, MA (US); Sean Garcen, Hudson, MA (US)

(73) Assignee: Telica, Inc., Marlboro, MA (US)

( * ) Notice: Subject to any disclaimer, the term of this patent is extended or adjusted under 35 U.S.C. 154(b) by 516 days.

(21) Appl. No.: 09/788,108

(22) Filed: Feb. 22, 2001

Related U.S. Application Data

(60) Provisional application No. 60/185,009, filed on Feb. 25, 2000.

(51) Int. Cl.[7] ................................................ G06F 11/00
(52) U.S. Cl. .......................................... 714/11; 714/12
(58) Field of Search ............. 714/11, 12; 709/208–211; 700/3

(56) References Cited

U.S. PATENT DOCUMENTS

| | | | | |
|---|---|---|---|---|
| 5,422,915 A | * | 6/1995 | Byers et al. ................. | 375/357 |
| 5,644,700 A | * | 7/1997 | Dickson et al. .................. | 714/9 |
| 5,870,538 A | | 2/1999 | Manning et al. ............... | 714/42 |
| 5,909,427 A | | 6/1999 | Manning et al. ............ | 370/219 |
| 6,065,135 A | * | 5/2000 | Marshall et al. ............... | 714/11 |
| 6,581,121 B1 | * | 6/2003 | Garcen et al. ............... | 710/300 |
| 6,614,752 B1 | * | 9/2003 | Parrish et al. ............... | 370/217 |
| 6,631,483 B1 | * | 10/2003 | Parrish ........................ | 714/55 |

\* cited by examiner

*Primary Examiner*—Robert Beausoliel
*Assistant Examiner*—Emerson Puente

(57) ABSTRACT

A system for indicating and determining a master unit from a plurality of logic units is described. The system includes a first logic unit configured to output a first obey signal and receive a first input signal, and a second logic unit configured to output a second obey signal and receive a second input signal. At least one of the first obey signal and the second obey signal is clocked, and a phase relationship of the second obey signal relative to the first obey signal is controllable by the first and second input signals. The system also includes a mastership determination logic unit configured to monitor the first and second obey signals. The mastership determination logic unit is configured to indicate that the first logic unit is the master unit when only the first obey signal is being clocked and to indicate that the second logic unit is the master unit when only the second obey signal is being clocked. The mastership determination logic unit is also configured to indicate that the first logic unit is the master unit when the first and second signals are being clocked in-phase and to indicate that the second logic unit is the master unit when the first and second signals are being clocked out-of-phase. A method of similar features is also describe.

4 Claims, 3 Drawing Sheets

MASTERSHIP DETERMINATION RULES WITH CLOCKED MASTERSHIP LINES

| A-OBEY | B-OBEY | PHASE | CONTROLLER DETERMINED TO BE WORKING | COMMENTS |
|---|---|---|---|---|
| NONE | NONE | N/A | A | ABNORMAL CONDITION, INCLUDED FOR COMPLETENESS NORMALLY ONE CONTROLLER SHOULD WANT TO BE MASTER |
| CLOCKING | NONE | N/A | A | CONTROLLER_B ABSENT, FAULTED OR DOESN'T WANT TO BE MASTER |
| NONE | CLOCKING | N/A | B | AS ABOVE, BUT FOR CONTROLLER_A |
| CLOCKING | CLOCKING | IN | A | BOTH CONTROLLERS ARE FUNCTIONING CORRECTLY AND A IS DETERMINED AS THE MASTER CONTROLLER |
| CLOCKING | CLOCKING | OUT | B | BOTH CONTROLLERS ARE FUNCTIONING CORRECTLY AND B IS DETERMINED AS THE MASTER CONTROLLER |

FIG. 3

FAULT TOLERANT MASTERSHIP SYSTEM AND METHOD

RELATED APPLICATION

This application claims priority to U.S. Provisional Application No. 60/185,009 filed on Feb. 25, 2000, which is incorporated herein in its entirety by reference.

FIELD OF THE INVENTION

Modern computers or communication systems typically use a multitude of cards interconnected through a connection board (e.g., a backplane). The connection board and the multitude of cards are designed and implemented so that they are scalable, allowing other cards to be added to the connection board.

Changes in operating condition of these cards and their connection board need to be communicated to equipment operators so that they know whether the equipment is functioning properly or critical faults have occurred. Hence, there is a need for a mechanism to communicate information from the cards to a central point to indicate the existence of critical faults in a timely manner. In this fashion, corrective action can be taken to eliminate or minimize any service disruption. This mechanism may also be capable of handling the changing configuration of the system, for example, if cards are added or removed.

In addition to reporting changes in operating condition, it is typically necessary for the central point to be able to control devices on the cards for maintenance and configuration operations. Accordingly, card redundancy is typically employed so that one card may provide services while another card is being maintained or repaired. The maintenance or configuration operation may be to correct a fault or to upgrade the capability of the card.

In particular, redundant system controllers are typically employed in a 1:1 (One-to-One) redundancy configuration in which there is a "Working" or active unit and a "Protection" or standby unit. In this scenario, the Working unit is the master controller. If the Working unit is removed from service, either due to a failure or a maintenance operation, then the Protection unit takes over. In this case, the mastership is said to have changed from the Working unit to the Protection unit.

In conventional systems, the Working unit is required to be reset whenever there is a change on the mastership. In such an arrangement, a failure of the reset would cause the controllers to function incorrectly. Moreover, the conventional systems use mastership signals (i.e., the signals output from the controllers to indicate which controller is the master) that are static. In this arrangement, a stuck-at-fault failure of one or more of the mastership signals is difficult to detect and isolate.

SUMMARY OF THE INVENTION

The present invention provides redundant mastership control mechanism that overcomes one or more of the above described shortcomings of the conventional systems. In particular, the present invention includes a system (and a corresponding method) for indicating and determining a master unit from a plurality of logic units is described. The system includes a first logic unit configured to output a first obey signal and receive a first input signal, and a second logic unit configured to output a second obey signal and receive a second input signal. At least one of the first and second logic units includes logic to output its respective obey signal as a time varying signal, and at least one of the first and second logic units includes logic to control a phase relationship of the second obey signal relative to the first obey signal in response to at least one of the first and second input signals.

The system also includes a mastership determination logic unit having logic to determine that the first logic unit is the master unit when only the first obey signal is time varying and to determine that the second logic unit is the master unit when only the second obey signal is time varying. The mastership determination logic unit further includes logic to determine that the first logic unit is the master unit when the first and second obey signals are time varying in-phase and to determine that the second logic unit is the master unit when the first and second obey signals are time varying out-of-phase.

In addition, each of the first and second obey signals includes a redundant trace signal. The first and second obey signals and their redundant trace signals are analyzed by the mastership determination logic unit to detect a fault when it occurs.

BRIEF SUMMARY OF THE DRAWINGS

The detailed description of a preferred embodiment of the present invention showing various distinctive features over prior art message servers may be best understood when the detailed description is read in reference to the appended drawing in which:

FIG. 3 is a table illustrating the rules used for the mastership determination logic.

DESCRIPTION OF THE PREFERRED EMBODIMENTS OF THE INVENTION

Preferred embodiments of the present invention may be used in conjunction with systems that need to provide redundant controllers on a plurality of cards or modules. For example, in one illustrative embodiment shown in FIG. 1, a system 100 includes a first and second host 103a–b, a first and second switch module 104a–b and a plurality of service modules 107a–n. Here, "n" is an arbitrary integer number. In this embodiment hosts 103a–b are substantially identical to each other and the switch modules 104a–b are substantially identical to each other to provide redundancy and enhanced reliability of system 100. In an exemplary embodiment, service modules 107a–n are I/O modules.

Figure 1:
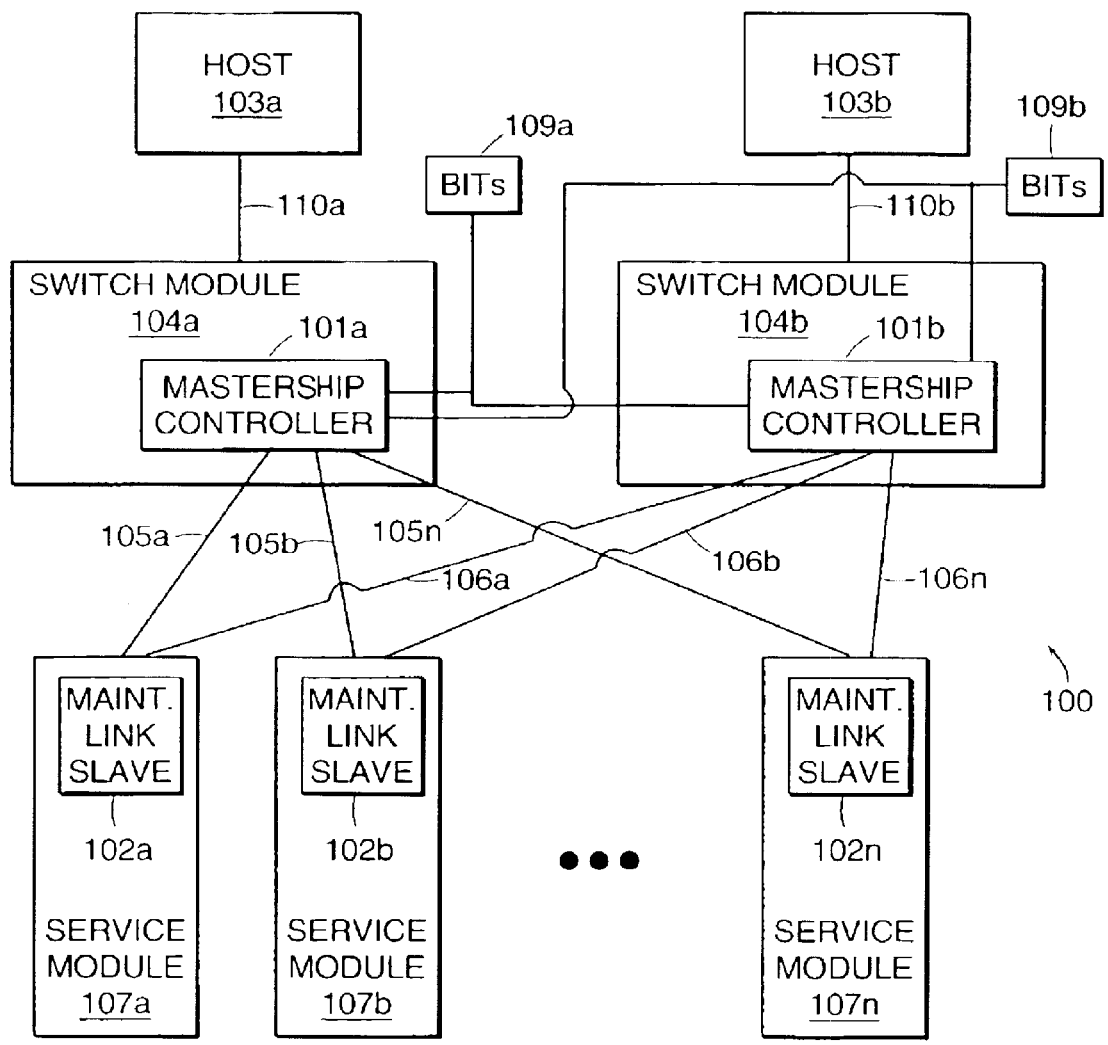
FIG. 1 is a block diagram illustrating the overall architecture of preferred embodiments.

In the illustrative embodiment of FIG. 1, first switch module 104a includes a mastership controller A (MC-A) 101a that communicates with a maintenance link slave (MLS) 102a–n on each service module 107a–n via a respective one of serial, bidirectional links 105a–n. Each link 105a–n may be formed as a separate etch trace on a backplane or mid-plane. Moreover, the illustrative embodiment of FIG. 1 includes a second MC (MC-B) 101b that, similar to MC-A, communicates with a maintenance link slave (MLS) 102a–n on each service module 107a–n via a respective one of the serial, bidirectional links 106a–n.

The use of redundant MCs 101a–b enhances reliability of system 100 and the maintenance link itself. MCs 101a–b of this embodiment are illustrated as being placed in switch modules 104a–b but there is no fundamental requirement for such placement. Instead criteria such as availability of chip space and logic gates may be used in determining preferred placements for such logic and circuitry. Furthermore, in the illustrative embodiment of FIG. 1, MCs 101a–b receive clocking information from a Building Integrated Time Sources (BITs) 109a–b, which are substantially synchronized to each other. Still referring to FIG. 1, each host 103a–b communicates with one of switch modules 104a–b via a corresponding bus 110a–b, such as a PCI bus. In this fashion, one of MCs 101a–b may communicate events and information from the bidirectional links 105a–n and 106a–n with status change interrupts to its host.

Figure 2:
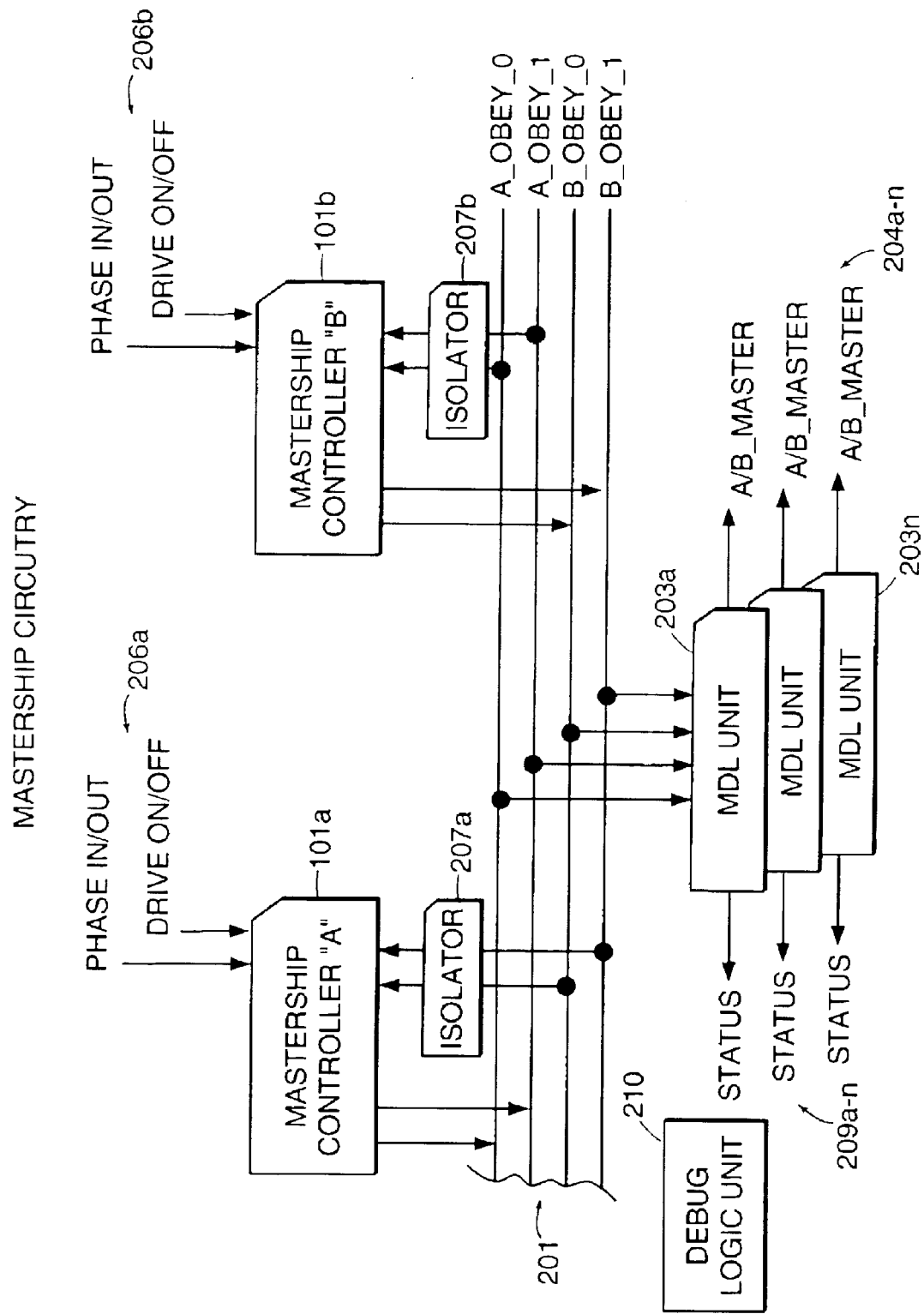
FIG. 2 is a block diagram illustrating mastership controller and mastership determination logic units.

Referring to FIG. 2, which illustrates the operations of MCs 101a–b in detail, there are shown MCs 101a–b, a number of mastership signals 201, an isolator 207a–b for each MC 101a–b and a number of mastership determination logic (MDL) units 203a–n. Mastership signals 201 preferably include four signals: A_OBEY_1, A_OBEY_0, B_OBEY_1 and B_OBEY_0. Two signals, A_OBEY_0 and A_OBEY_1, are driven by MC-A 101a. The other two signals B-OBEY_0 and B_OBEY_1, are driven by MC-B 101b. Each component in system 100 that needs to determine which one of MCs 101a–b is its master includes one of MDL units 203a–n. The above described configuration, by its virtue of having redundant circuits and signal lines, survives a single fault (e.g., a broken backplane pin, a shorted receiver or the like). For instance, two mastership signals are provided to each of MCs 101a–b in order enhance reliability and to identify and isolate faults. It should be noted, however, only one mastership signal may be required for each of MCs 101a–b in order to allow MDL units 203a–n to determine the mastership. It should be noted that embodiments having more than two MCs (e.g., 4, 6, etc.) are also contemplated with this invention. Each of the above described components are described in more detail below.

Mastership signals 201 are preferably clocked as a way of performing real-time diagnostics as well as indicating mastership. For instance, when MC-A 101a is the master, it drives its mastership signals by clocking them. When the mastership signals are clocked, they are varied in time rather than staying at one level. This allows stuck-at-faults of the mastership signals to be detected as described later. In preferred embodiments, the frequency of the mastership signals 201 is derived from a separate system clock source. The two mastership signals from each of MCs 101a–b are clocked substantially identical to each other. Only one of the two signals needs to be clocking for MDL units 203a–n to function. The frequency of the clock is preferably 8 KHz. En an alternative embodiment, frequency may be 100 MHz. It should be noted that the clock frequency is determined by how fast a stuck-at-fault of the mastership signals is required to be detected and isolated. For instance, a fast response requirement would be met by a fast clock frequency.

Each MDL unit 203a–n is configured to output a A/B_MASTER signal 204a–n and a status signal 209a–n. Each A/B_Master signal 204a–n is coupled to its corresponding service module 107a–n. Functionally, each A/B_MASTER signal 204a–n indicates in a binary fashion which one of MCs 101a–b is believed to be the master controller. Each status signal 209a–n is coupled to a debug logic unit 210. Status signals 209a–n are preferably used by debug logic unit 210 for failure isolation. More specifically, status signals 209a–n indicate whether each of the four mastership signals 201 is clocking or not and, if one or more the signals is not clocking, what its current binary state is. Based on status signals 209a–b, debug logic unit 210 performs failure detection or interrupt service process to react to failures.

For instance, when one of status signals, e.g., 209a, indicates that one of the mastership signals, e.g., A_OBEY_0, is stuck while other status signals 209b–n indicate no fault, then the fault is likely to be a localized error limited to one or more of service module 107a, its MLS 102a and the wire trace from MC-A 101a to service module 107a. However, if all of status signals 209a–b units indicate that A_OBEY_0 is stuck, then the error may be more global and MC-A 101a may be at fault.

In addition, since two mastership signals are provided for each MC 101a–b, even if one of them is stuck-at-fault the other one of the two signals allow proper functioning MCs 101a–b. However, MDL units 203a–n may detect the stuck-at-fault failure and identify failure to debug logic unit 210 using status signals 209a–n.

In preferred embodiments, an additional copy of MDL unit may be coupled to MCs 101a–b so that faults and status may be handled by higher level processes running on hosts 103a–b that are controlling MCs 101a–b.

The higher level process manipulates the mastership state of MCs 101a–b by a set of two signals 206a–b. Each set of two signals 206a–b includes: a drive on/off signal and a phase in/out signal. The host 103a controls the drive on/off and phase in/out signals for MC-a 101-a. The host 103b controls the drive on/off and phase in/out signals for MC-b 101-b. The drive on/off signals control whether the MCs 101a–b should be clocking its mastership signals. If a host is not ready to take mastership, then it should have its drive signal off, so the MDL units will not pick the MC 101a as the master. The phase in/out signals control whether the driven mastership signals 201 should be in-phase or out-of-phase. When one of MCs 101a–b does not to drive its mastership signals, then its output does not effect is mastership signals 201. This feature may be used for fault isolation purposes. Furthermore, MC-A 101a may detect (the phase of MC-B's 101b mastership signal in order to determine the clock phase to be driven in order to take over mastership.

In order to prevent single points of failure, isolator 207a, b is placed between each MC 101a, b and their corresponding mastership signals. Thus, mastership signals A_OBEY_1 and A_OBEY_0 are not affected if MC-B 101b is faulted, and conversely the B_OBEY signals are isolated from the MC-A 101a. For instance, when one of MCs, e.g., MC-A 101a, is malfunctioning (e.g., burned), it is isolated from the functioning mastership signals by its isolator.

By providing redundant mastership signals 201 and driving those signals with clocks in-phase or out-of-phase, the reliability of controlling the mastership of system 100 is enhanced. The description of the relationship among the mastership signals, clocks and their in-phase/out-of-phase states are provided below.

The table in FIG. 3 illustrates the rules for mastership determination in preferred embodiments. If the higher-level processes want to cause a mastership change, the higher level process signals to the mastership controller to change the phase. More specifically, if MCA 101a is to be the working controller then in-phase and if MC-B 101b is to be the working controller, then out-of-phase. In preferred embodiments there are two higher level processes, the Working process, sometimes referred to as the master process, and the Protection process, sometimes referred to as the standby process. All components in the system obey the Working process. If the Working process fails, the Protection process takes over by performing the mastership change.

The Working and Protection process have mechanisms that are outside the scope of the present invention that determine when a process has failed.

By having the phase indicate which process, A or B, is the working process, the protection master controller does not have to control the output of the working mastership controller in order to take over mastership.

The following describes how the control and mastership determination logic are employed in preferred embodiments:

Initialization with redundant processes: Both MCs 101a–b have a reset condition set not to drive. In this case MC-A 101a is the master by default. After mastership has been resolved by a state comparison between the two higher-level processes, then the Working higher level process will tell its MC (MC-A 101a or MC-B 101b) to drive the mastership signals. The phase selected will be based on whether A or B has been determined by higher level software to be the Working mastership controller. The Protection mastership controller will lock onto Working mastership controller's clock phase from the mastership signals. The Protection higher-level process will command its MC (MC-A 101a or MC-B 101b) to drive the mastership signals only after it has been synchronized.

Initialization with a single process and mastership controller: If the higher level process determines that it is the only process in the system, then it commands its MC (MC-A 101a or MC-B 101b) to drive clock in-phase. Since this is the only mastership controller clocking the master lines, it is determined as the master.

Both processes are running with A operating as Working, and A gets a fault: Higher level process A communicates to process B to take over mastership. Process B commands the Mastership Controller to run out-of-phase to cause the fail-over.

Both processes are running with B operating as Working, and B gets a fault: Higher level process B communicates to process A to take over mastership. Process A commands the Mastership Controller to run in-phase to cause the fail-over.

Both higher level processes are running and A operating as Working, and then B gets a fault: The higher level process on B commands MC-B 101b to stop driving.

Both higher level processes are running and B operating as Working, and then A gets a fault: The higher level process on A commands MC-A 101a to stop driving.

A new controller/process is inserted into a working system as Mastership Controller B: The Mastership Controller locks onto A mastership clock, but does not drive. When the higher level processes on B are ready to be considered as a candidate for mastership, the higher level process commands the MC-B 101b to start driving, in-phase.

A new controller/process is inserted into a working system as Mastership Controller A: The Mastership Controller locks onto B mastership clock, but does not drive. When the higher level processes on A are ready to be considered as a candidate for mastership, the higher level process commands the MC-B 101b to start driving, out-of-phase.

The many features and advantages of embodiments of the present invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for indicating and determining a master unit from a plurality of logic units, comprising:

a first logic unit configured to output a first obey signal and receive a first input signal;

a second logic unit configured to output a second obey signal and receive a second input signal, wherein at least one of the first and second logic units includes logic to output its respective obey signal as a time varying signal and wherein at least one of the first and second logic units includes logic to control a phase relationship of the second obey signal relative to the first obey signal in response to at least one of the first and second input signals; and a mastership determination logic unit having logic to determine that the first logic unit is the master unit when only the first obey signal is time varying and to determine that the second logic unit is the master unit when only the second obey signal is time varying, wherein the mastership determination logic unit further including logic to determine that the first logic unit is the master unit when the first and second obey signals are time varying in-phase and to determine that the second logic unit is the master unit when the first and second obey signals are time varying out-of-phase.

2. The system of claim 1 wherein each of the first and second obey signals includes a redundant trace signal, and wherein the first and second obey signals and their redundant trace signals are analyzed by the mastership determination logic unit to detect a fault when it occurs.

3. A system for indicating and determining a master unit from a plurality of logic units, comprising:

a first logic unit configured to output a first obey signal and receive a first input signal;

a second logic unit configured to output a second obey signal and receive a second input signal, wherein a phase relationship of the second obey signal relative to the first obey signal is controllable by the first and second input signals; and a mastership determination logic unit in electrical communication with the first and second obey signals, the mastership determination logic unit is further configured to monitor the phase relationship of the first and second obey signals to determine whether the first or second logic units is the master unit based on the phase relationship of the signals.

4. The system of claim 3 wherein the first obey signal includes a redundant trace signal, wherein the second obey signal includes a redundant trace signal, and wherein the first and second obey signals and their redundant trace signals are analyzed by the mastership determination logic unit to detect a fault when it occurs.

* * * * *